United States Patent [19]

Sills

[11] 3,851,901
[45] Dec. 3, 1974

[54] MECHANICAL PIPE COUPLINGS

[76] Inventor: Cecil M. Sills, 530 Catalina Rd., Fullerton, Calif. 92635

[22] Filed: Oct. 17, 1973

[21] Appl. No.: 407,308

[52] U.S. Cl.................... 285/112, 285/236, 285/373
[51] Int. Cl............................................... F16l 17/00
[58] Field of Search ........... 285/236, 112, 364, 365, 285/366, 367, 406, 408, 407, 409, 410, 411, 413, 415, 414, 373, 229

[56] References Cited
UNITED STATES PATENTS

| | | | |
|---|---|---|---|
| 1,571,343 | 2/1926 | Register | 285/112 |
| 1,829,236 | 10/1931 | Perkins | 285/236 X |
| 2,387,410 | 10/1945 | Roe | 285/367 X |
| 2,451,438 | 10/1948 | Hartman | 285/236 |
| 3,233,922 | 2/1966 | Evans | 285/236 |
| 3,394,952 | 7/1968 | Garrett | 285/236 |

Primary Examiner—Dave W. Arola
Attorney, Agent, or Firm—Philip M. Hinderstein

[57] ABSTRACT

Mechanical pipe couplings for providing fluid-tight joints between two abutting pipe ends, in a pressure system, each of the pipe ends having an annular groove in the outer surface thereof. According to the preferred embodiment of the invention, the pipe coupling includes two pairs of identical locking rings positionable around the pipe ends, each locking ring having a tongue which extends into the adjacent groove in one of the pipe ends and an annular groove in the outer surface thereof; an annular sealing gasket positionable between the pairs of locking rings; an elongate, planar, flexible, connecting shield wrapable around the locking rings and the sealing gasket and having grooves or ridges in the opposite sides thereof which mate with the grooves in the locking rings; and a pair of hose clamps positionable around the connecting shield and being tightenable to secure the sides of the connecting shield in the grooves in the locking rings to connect the locking rings and the pipe ends together. According to a second embodiment, the locking rings are omitted and the sides of the connecting shield mate with the grooves in the pipe ends. According to a third embodiment, the shield is divided into two halves, each half being made integral with two of the locking rings, one from each pair.

14 Claims, 6 Drawing Figures

MECHANICAL PIPE COUPLINGS

BACKGROUND OF THE INVENTION

1. Field of the Invention.

The present invention relates to mechanical pipe couplings and, more particularly, to pipe couplings for providing fluid-tight joints between two abutting pipe ends in a pressure system.

2. Description of the Prior Art.

Pipe systems are used in a wide variety of installations, such as in the mining and petroleum industry, in industrial, commercial, and residential buildings, and the like. Such pipe systems can be generally classified into two categories, namely nonpressure systems and pressure systems. While the type of pipe used in these two systems may not change significantly, if at all, the methods of joining sections of pipe do vary significantly.

For example, in the case of nonpressure systems, simple pipe couplings have been developed including a resilient annular gasket being positionable around the abutting pipe ends, an elongate, planar, flexible, connecting shield being positionable around the sealing gasket, and a pair of hose clamps being positionable around the sides of the connecting shield, the clamps being tightenable to secure the sides of the connecting shield to the pipe ends, with the sealing gasket therebetween. Such a coupling is widely used and is highly satisfactory in a nonpressure system. However, since there is no mechanical connection between the connecting shield and the pipe ends, such a coupling would not hold the pipe ends together in a pressure system.

The need for pipe joints which hold in a pressure system has given rise to threading, welding, and flanging as methods of joining pipe. All three methods are reasonably efficient but have certain disadvantages associated therewith. Threaded joints are the most commonly used type of pipe coupling. Threaded joints are suitable for low and moderate temperature and pressure applications, a minimum amount of skill is required in the installation, and no fire hazard is created during installation. However, threaded joints require relatively thick pipe walls to withstand design pressures and special compounds are required to insure joint tightness. Threaded joints do not allow easy disassembly and do not allow for longitudinal movement of the pipes.

Flanged joints are used as a means of installing and dismantling valves and fittings and are suitable for use in the same applications as threaded joints. Flanged joints have the additional advantage that they are reclaimable and eliminate the need for separate unions. However, screw-on flanges have the same limitations as those of threaded joints unless they are backwelded. Bolted flanges occupy greater areas in order to accommodate the bolt hole patterns, necessitate a more critical alignment, and require adequate accessibility for bolt installation.

Welded joints, when made by a competent welder, are superior to either threded or flanged joints. They are lighter, less susceptible to leakage, and require less maintenance. However, welded pipeing cannot be dismantled and welding is not permitted in hazardous locations because of the fire hazard created during installation. In addition, welded joints are rigid and means must be provided to allow for expansion and contraction and for stress relief.

These problems are largely solved by available mechanical coupling methods of joining pipe in pressure systems. The known mechanical pipe couplings incorporate most of the desirable features of other coupling methods but, in addition, are comparably smaller, lighter, and can be installed in less time. Mechanical couplings eliminate the need for flanges or unions and allow easy disassembly for cleanout and replacement. Mechanical pipe couplings allow for angular pipe deflection and longitudinal pipe movement and no separate means is required to allow for expansion and contraction. Mechanical coupling methods allow for direct connection of valves and fittings, reduce the possibility of corrosion at joints, allow for rotation of pipe to distribute wear, seal more tightly at high pressures, and present no fire hazard during installation.

Mechanical pipe couplings provide a fluid-tight joint between two abutting pipe ends, in a pressure system, each of the pipe ends usually having an annular groove in the outer surface thereof. The available mechanical pipe couplings include a two-segment housing, each segment being semicircular and having a pair of parallel key sections which engage the complete circumference of the pipe grooves. Positioned within the segmented housing is a resilient, annular, sealing gasket which is positionable around the abutting pipe ends and provides a compression seal, the pressure in the line strengthening the seal. The two segments of the housing are connected together by means of two bolts and two nuts which engage flanges at the ends of the two housing segments.

While such mechanical pipe couplings represent a significant advance in the state of the art over threading, welding, and flanging as methods of joining pipe, certain problems still exist. The most inexpensive method used to date to manufacture available mechanical pipe couplings is by casting. However, it has not been possible to use cast iron, which is the least expensive of available materials, because the method used to attach the two housing segments tend to bend the segments which would cause breakage of cast iron. It has, therefore, been required to use more expensive materials which will withstand the forces encountered during tightening of the housing segments. Available mechanical pipe couplings are relatively heavy and are not as simple to manufacture as is possible. They also require complete disassembly for attachment to a pipe joint.

SUMMARY OF THE INVENTION

In accordance with the present invention, there are provided mechanical pipe couplings for providing fluid-tight joints between two abutting pipe ends in a pressure system which represent a still further advancement in the state of the art in methods of joining pipe. The present mechanical pipe couplings are substantially lighter in weight than prior art mechanical pipe couplings and are significantly easier to use. The construction of the present mechanical pipe couplings is such tht the tensile stresses encountered while tightening available mechanical pipe couplings are entirely eliminated. With the present mechanical pipe couplings, the forces thereon are uniformly distributed entirely around the pipe and such forces are purely compressive forces. With the elimination of the tensile stresses, the locking rings of the present mechanical pipe couplings may be manufactured from lighter and cheaper materials, such as cast iron, aluminum, steel, or even plastic. The present mechanical pipe couplings are easy to manufacture and, overall, are more advantageous than pipe couplings used heretofore.

Briefly, the present embodiments of mechanical pipe couplings for providing fluid-tight joints between two abutting pipe ends in a pressure system are designed for use with annular grooves in the outer surface of each pipe end. According to the preferred embodiment of the invention, the pipe coupling comprises two pairs of identical semicircular locking rings, each locking ring having an inwardly projecting tongue adapted to extend into the grooves in the pipe ends and an annular groove in the outer surface thereof, one pair of rings being adapted to surround one of the pipe ends and the other pair of rings being adapted to surround the other of the pipe ends; a resilient annular sealing gasket being positionable around the abutting pipe ends, between the pairs of locking rings; an elongate, planar, flexible connecting shield being positionable around the locking rings and the sealing gasket, the width of the connecting shield being approximately equal to the combined width of the sealing gasket and the pairs of locking rings, the opposite ends of the connecting shield overlapping; and a pair of hose clamps being positionable around the sides of the connecting shield, the clamps being tightenable to secure the sides of the connecting shield in the grooves in the pairs of locking rings to connect the locking rings and the pipe ends together. According to the preferred embodiment of the invention, the sides of the connecting shield have grooves or ridges therein which permit the sides to mate with the grooves in the locking rings.

According to a modified form of the preferred embodiment, the side of the tongue of each locking ring closest to the joint between the pipe ends is tapered at an acute angle relative to a plane normal to the axes of the pipe ends so that the inner periphery of the tongue is wider than the outer periphery thereof, and the adjacent side of the grooves in the pipe ends are positioned at an identical angle. According to a second embodiment of the invention, the locking rings are omitted, the sides of the connecting shield mate with the grooves in the pipe ends, and the hose clamps secure the sides of the connecting shield directly in the grooves in the pipe ends. According to a third embodiment of the invention, the shield is divided into two halves, each half being made integral with two of the locking rings, one locking from each pair.

OBJECTS

It is therefore an object of the present invention to provide an improved mechanical pipe coupling.

It is a further object of the present invention to provide a pipe coupling which will provide a fluid-tight joint between two abutting pipe ends in a pressure system.

It is a still further object of the present invention to provide a mechanical pipe coupling in which only compressive forces are developed and such forces are uniformly distributed around the pipe coupling.

It is another object of the present invention to provide a mechanical pipe coupling which is lightweight, easy to manufacture, and easy to use.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

DESCRIPTION OF THE PREFERRED EMBODIMENTS

Figure 1:
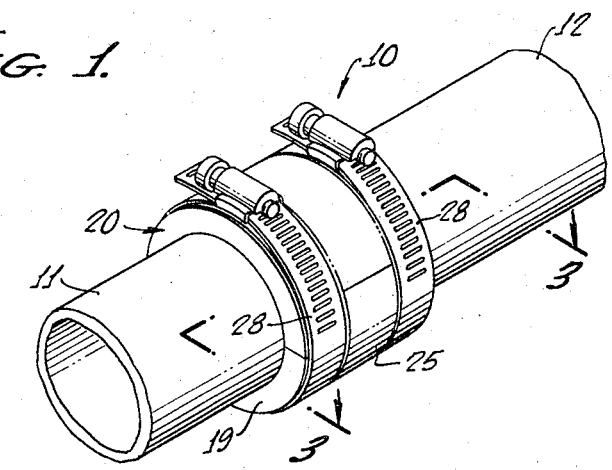
FIG. 1 is a perspective view of a preferred embodiment of the present mechanical pipe coupling shown in operative position providing a fluid-tight joint between two abutting pipe ends in a pressure system.
Figure 3:
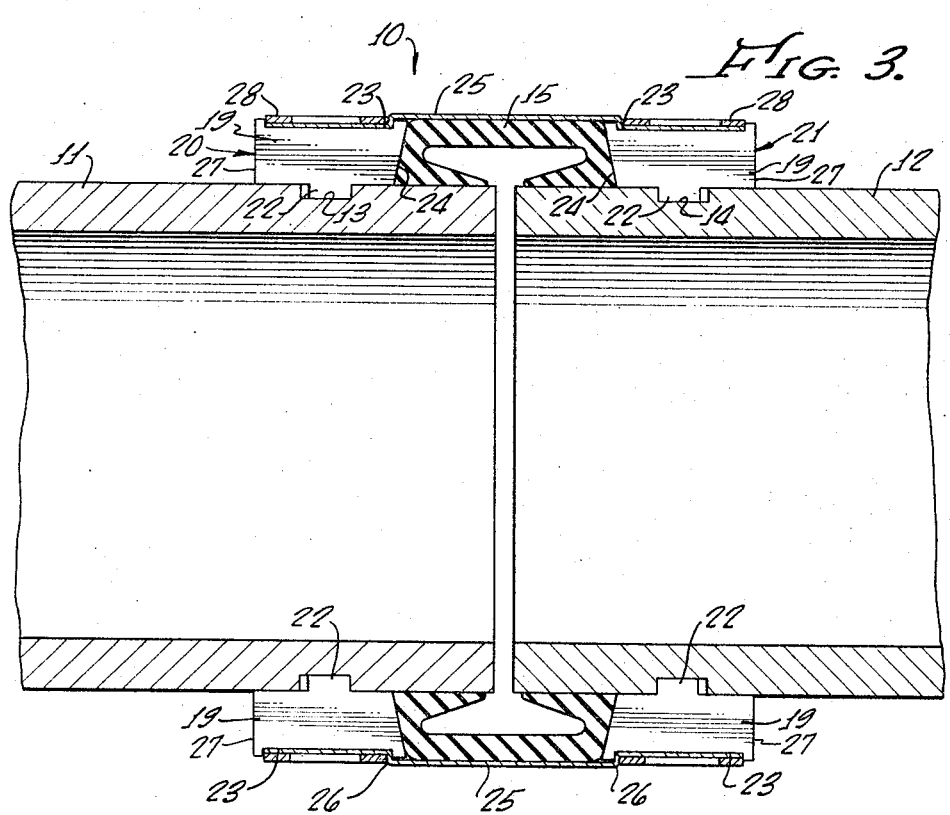
FIG. 3 is an enlarged, cross-sectional view taken along the line 3—3 in FIG. 1.
Figure 2:
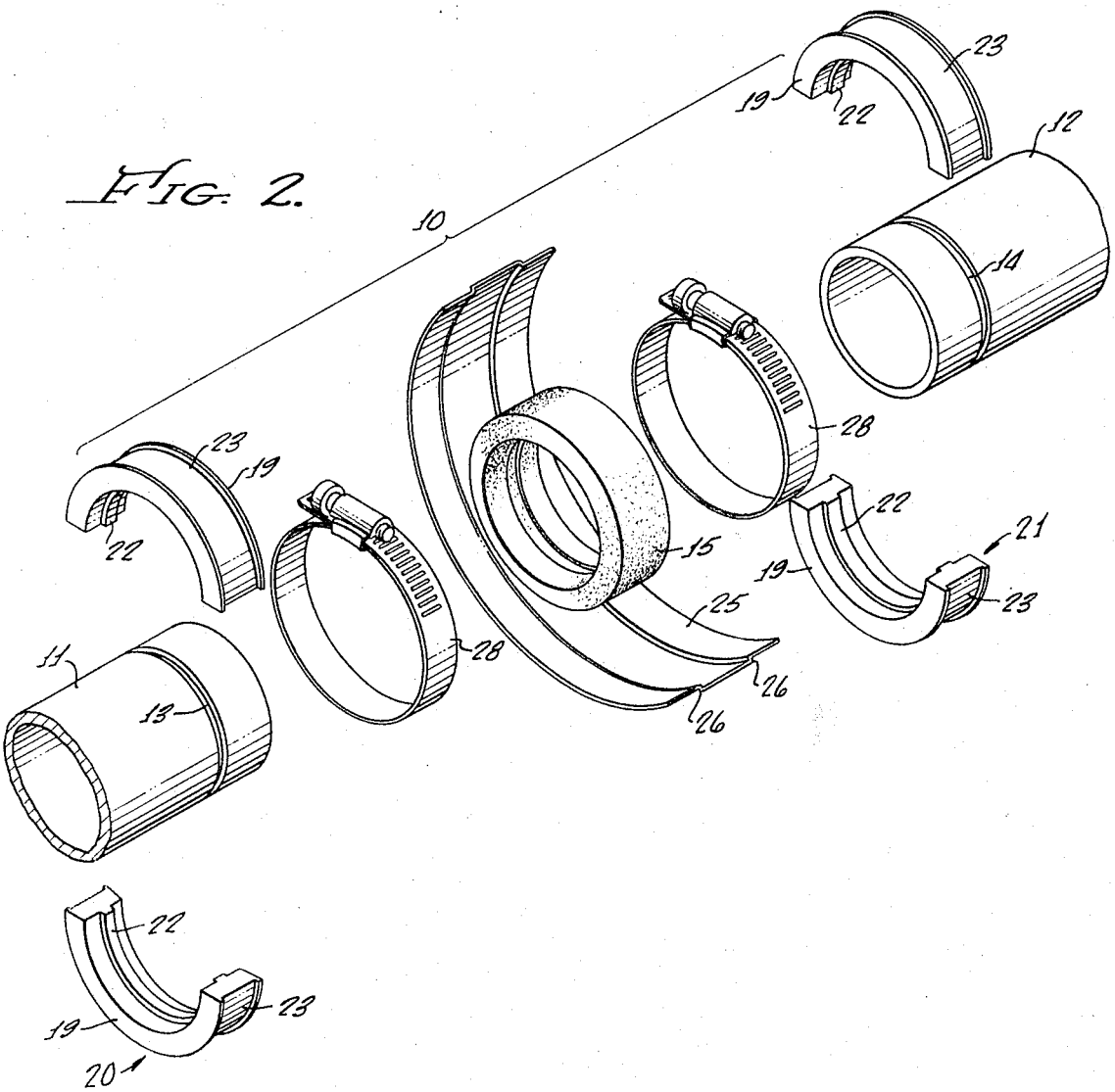
FIG. 2 is an exploded, perspective view of the mechanical pipe coupling of FIG. 1.

Referring now to the dawings and, more particularly, to FIGS. 1–3 thereof, there is shown a preferred embodiment of mechanical pipe coupling, generally designated 10, for providing a fluid-tight joint between two abutting pipe ends 11 and 12. Pipe coupling 10 is of the type which requires each of pipe ends 11 and 12 to have an annular groove 13 and 14, respectively, in the outer surface thereof. Pipe coupling 10 also includes, as one element thereof, a resilient, annular, sealing gasket 15 of the same general type used with prior mechanical pipe couplings which is positionable around abutting pipe ends 11 and 12. Gasket 15, when suitably confined, provides a compression seal and the pressure within pipes 11 and 12 serves to strengthen the seal. The construction and operation of sealing gasket 15 is known to those skilled in the art.

According to the preferred embodiment of the present invention, pipe coupling 10 further comprises two pairs 20 and 21 of identical, semicircular locking rings 19. Each locking ring 19 has a generally rectangular cross-section, the inner surfaces of which have the same radius of curvature as the outer surfaces of pipe ends 11 and 12. Each locking ring 19 has an inwardly projecting, rectangular tongue 22 which is adapted to extend into grooves 13 and 14 in pipe ends 11 and 12, respectively. Each locking ring 19 also has an annular groove 23 in the outer surface thereof, which groove extends almost for the entire width thereof. Pair 20 of rings 19 is adapted to surround pipe end 11 and pair 21 of locking rings 19 is adapted to surround pipe end 12. However, since each of rings 19 is identical, they are completely interchangeable.

As shown most clearly in FIG. 3, sealing gasket 15 has a generally trapezoidal cross-section, the sides thereof being tapered at a small angle. Therefore, according to the preferred embodiment of the present invention, one side 24 of each of locking rings 19 is tapered at an angle equal to the angle of the sides of sealing gasket 15, sides 24 of locking rings 19 being positionable in contact with the sides of gasket 15. In this manner, locking rings 19 not only engage pipe ends 11 and 12 but contain the sides of gasket 15 with a strong 360° metal enclosure. In addition, it will be apparent to those skilled in the art that the other side 27 of each of locking rings 19 may be tapered at the same angle as side 24 so as to make locking rings 19 symmetrical and, therefore, reversible.

Pipe coupling 10 further comprises an elongate, planar, flexible, connecting shield 25, the width of connecting shield 25 being approximately equal to the combined width of sealing gasket 15 and pairs 20 and 21 of locking rings 19. Connecting shield 25 may conveniently be made from flat, strip, stainless steel having a gauge which is a function of the desired strength of the joint. As shown most clearly in FIGS. 1 and 3, connecting shield 25 is adapted to be wrapped around sealing gasket 15 and both pairs 20 and 21 of locking rings 19 to entirely enclose such elements thereby containing the outer circumference of gasket 15 with a strong 360° metal enclosure.

According to the preferred embodiment of the present invention, the opposite sides of connecting shield 25 have grooves or ridges therein, as shown at 26, which permit the sides of connecting shield 25, beyond ridges 26, to extend into and mate with grooves 23 in locking rings 19.

Finally, pipe coupling 10 further comprises a pair of hose clamps 28 of conventional configuration. The width of each hose clamp is slightly less than the width of grooves 23 in locking rings 19. Hose clamps 28 are positionable around the sides of connecting shield 25, aligned with grooves 23, and may be connected to shield 25 by means of eyelets or rivets, as known in the art. Thus, hose clamps 28 are tightenable to secure the sides of connecting shield 25 in grooves 23 in locking rings 19. Such tightening of hose clamps 28 operates to securely connect the opposite sides of connecting shield 25 to the two pairs 20 and 21 of locking rings 19. The body of connecting shield 25 thus securely connects the two pairs 20 and 21 of locking rings 19 together. Finally, because of the engagement of tongues 22 of locking rings 19 in grooves 13 and 14 of pipe ends 11 and 12, respectively, pipe ends 11 and 12 are securely interconnected.

OPERATION

In use, pipe coupling 10 is operative to permit the simple and efficient connection of abutting pipe ends 11 and 12. With the opposite ends of connecting shield 25 overlapping and hose clamps 28 in position around the opposite sides of connecting shield 25, connecting shield 25 is positioned around one of pipe ends 11 and 12, but away from the intersection thereof. Sealing gasket 15 is then manipulated onto one of pipe ends 11 or 12 and the other pipe end 11 or 12 is then brought into abutting relationship, sealing gasket 15 being manipulated into the position shown in FIG. 3. A first pair 20 or 21 of locking rings 19 is then positioned around one of pipe ends 11 or 12, respectively, with tongues 22 extending into grooves 13 or 14, respectively, as the case may be. With hose clamps 28 sufficiently loosened, connecting shield 25 is then slid over sealing gasket 15 and the positioned pair 20 or 21 of locking rings 19. The other pair 20 or 21 of locking rings 19 is then positioned around the other of pipe ends 11 or 12, respectively, and connecting shield 25 manipulated to the position shown in FIGS. 1 and 3, surrounding sealing gasket 15 and both pairs 20 and 21 of locking rings 19. Hose clamps 28 are then tightened to secure the sides of connecting shield 25 in grooves 23 in locking rings 19 and the mechanical coupling is completed.

The combination of connecting shield 25 and pairs 20 and 21 of locking rings 19 securely hold in place sealing gasket 15 and contain gasket 15 with a strong 360° metal enclosure. Tongues 22 of locking rings 19 engage the entire 360° of grooves 13 and 14 in pipe ends 11 and 12, respectively, in a grip that is both secure and flexible. Pipe coupling 10 permits pipe ends 11 and 12 freedom to expand and contract with temperature changes. Since longitudinal and settlement stresses are relieved automatically, there is no need for expensive expansion joints. Installation is simple and speedy, only a screwdriver being required.

Of particular significance is the fact that hose clamps 28 apply a uniformly distributed compressive force around the entire circumference of locking rings 19, thereby minimizing the destructive forces thereon. Therefore, locking rings 19 may be made from inexpensive materials without fear of breakage. Also, because of the simple configuration of locking rings 19, they may be machined or manufactured in any other simple manner.

DESCRIPTION OF ALTERNATE EMBODIMENTS

Figure 4:
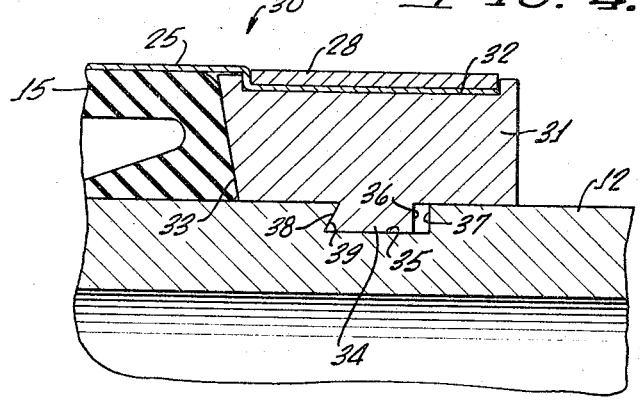
FIG. 4 is an enlarged, partial, cross-sectional view, similar to the view of FIG. 3, showing a modified form of the embodiment of FIGS. 1–3.

Referring now to FIG. 4, there is shown a modified form of the preferred embodiment of mechanical pipe coupling, generally designated 30, for providing a fluid-tight joint between abutting pipe ends 11 and 12. Pipe coupling 30 is essentially identical to pipe coupling 10 and includes sealing gasket 15, connecting shield 25, and hose clamps 28. The only difference between pipe coupling 30 and pipe coupling 10 is that pipe coupling 30 includes a pair of locking rings 31 of modified construction.

Each locking ring 31 has a generally rectangular cross-section, the inner surfaces of which have the same radius of curvature as the outer surfaces of pipes 11 and 12. Each locking ring 31 has an annular groove 32 in the outer surface thereof, which groove extends almost for the entire width thereof, to receive one of hose clamps 28, as described previously. Furthermore, at least one side 33 of each locking ring 31 is tapered at an angle equal to the angle of the sides of sealing gasket 15, as described previously. Finally, each locking ring 31 has an inwardly projecting tongue 34 which extends into a groove 35 in pipe ends 11 or 12.

The difference between locking rings 19 and 31 resides in the configuration of tongues 22 and 34 and grooves 13, 14, and 35. More specifically, and as shown in FIG. 3, grooves 13 and 14 and tongues 22 are rectangular in configuration, the overall width of each tongue 22 being smaller than the overall width of grooves 13 and 14 to permit axial movement of pipe ends 11 and 12. In the case of locking rings 31, the sides 36 and 37 of tongue 34 and groove 35, respectively, positionable farthest from the joint between pipe ends 11 and 12 are normal to the axis of pipes 11 and 12. On the other hand, the sides 38 and 39 of tongue 34 and groove 35, respectively, positionable closest to the joint between pipe ends 11 and 12 are tapered at an acute angle relative to a plane normal to the axis of pipe ends 11 and 12. Thus, the inner periphery of tongue 34 is wider than the outer periphery thereof. Furthermore, the overall width of each of tongues 34 is smaller than the overall width of each of annular grooves 35, the widest portion of tongue 34 being narrower than the narrowest portion of groove 35 to permit insertion of tongues 34 into grooves 35. However, after locking rings 31 are positioned as shown in FIG. 4, with tongues 34 inserted into grooves 35, locking rings 31 are moveable towards each other to bring sides 38 of tongues 34 into contact with sides 39 of grooves 35. In this position, the spacing between the pairs of locking rings 31 is equal to the width of sealing gasket 15.

In use, the pressure within pipes 11 and 12 in a pressure system operates to exert a radially outwardly directed force on each of locking rings 31 and an axially outwardly directed force on pipes 11 and 12. While these forces are normally retained by hose clamps 28, the construction shown in FIG. 4 provides an additional interlocking engagement between each locking ring 31 and pipe ends 11 and 12 so as to increase the ability of pipe coupling 30 to withstand the pressures within pipe ends 11 and 12. Any radially outward movement of rings 31 serves only to increase the holding force between surfaces 38 and 39, tightening the mechanical joint provided by coupling 30. Furthermore, any axially outward movement of pipes 11 and 12 also serves only to increase the holding force on surface 38 of locking rings 31, again tightening the joint.

As is the case with the sides of locking rings 31, it will be apparent to those skilled in the art that sides 36 and 37 of tongue 34 and groove 35, respectively, may be tapered at the same angle as sides 38 and 39. With both sides of locking rings 31, tongues 34, and grooves 35 tapered, each locking ring 31 is symmetrical and can be used with any orientation.

Figure 5:
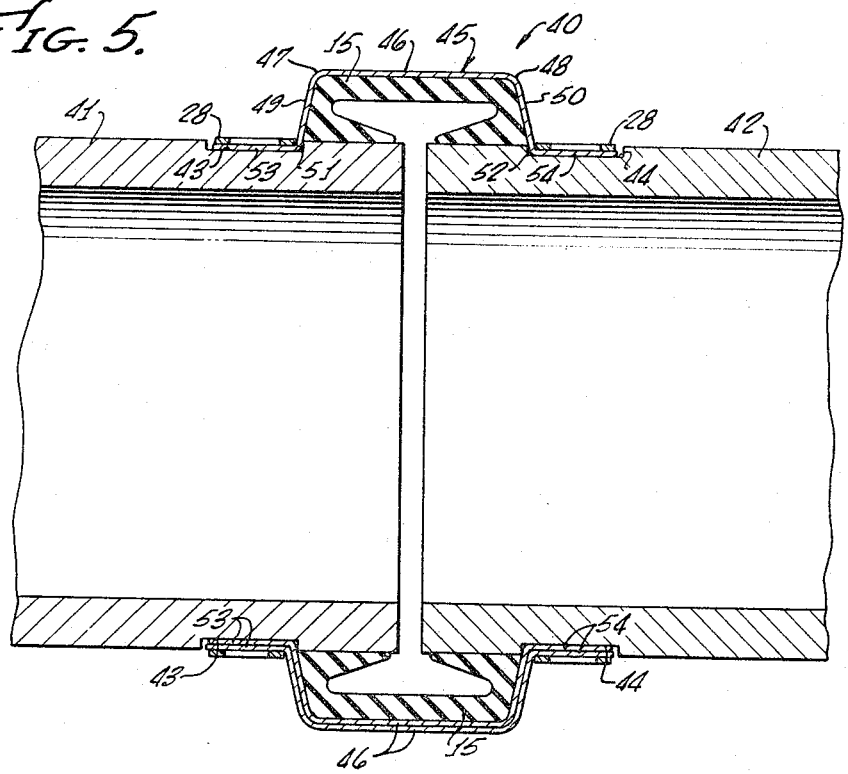
FIG. 5 is a cross-sectional view, similar to the view of FIG. 3, of a second embodiment of mechanical pipe coupling shown in operative position providing a fluid-tight joint between two abutting pipe ends in a low pressure system.

Referring now to FIG. 5, there is shown a second embodiment of mechanical pipe coupling, generally designated 40, for providing a fluid-tight joint between abutting pipe ends 41 and 42. The significant difference between pipe coupling 40 and pipe coupling 10 is that in pipe coupling 40, pairs 20 and 21 of locking rings 19 are omitted. Thus, pipe ends 41 and 42 have annular grooves 43 and 44, respectively, in the outer surfaces thereof, grooves 43 and 44 being substantially wider than grooves 13 and 14 in pipe ends 11 and 12, respectively. Pipe coupling 40 also includes sealing gasket 15, a connecting shield 45, and hose clamps 28. The only other difference between pipe coupling 40 and pipe coupling 10 is that connecting shield 45 is of modified construction.

More specifically, connecting shield 45 is an elongate, planar, flexible member, the width of which is substantially larger than the combined width of sealing gasket 15 and grooves 43 and 44 in pipe ends 41 and 42, respectively. The central section 46 of connecting shield 45 is planar and has a width equal to the width of the outer periphery of sealing gasket 15. Connecting shield 45 is then bent inwardly, at 47 and 48, to provide sections 49 and 50, respectively, which extend along the sides of sealing gasket 15. Thus, sections 49 and 50 of connecting shield 45 are positioned at an angle relative to central section 46 which is equal to the angle of the sides of sealing gasket 15. Sections 49 and 50 of connecting shield 45 terminate in grooves 43 and 44 in pipe ends 41 and 42, respectively, where connecting shield 45 is bent outwardly, at 51 and 52, to provide sections 53 and 54, respectively, which extend parallel to section 46, sections 53 and 54 being in contact with grooves 43 and 44, respectively.

Hose clamps 28 have the same configuration as described previously. The width of each hose clamp 28 is slightly less than the width of grooves 43 and 44 in pipe ends 41 and 42, respectively. Hose clamps 28 are positionable around side sections 53 and 54 of connecting shield 45 and are tightenable to secure sections 53 and 54 of connecting shield 45 in grooves 43 and 44, respectively, in pipe ends 41 and 42. Such tightening of hose clamps 28 operates to securely connect the opposite sides 53 and 54 of connecting shield 45 to the two pipe ends 11 and 12. In addition, connecting shield 45, in and of itself, securely holds in place sealing gasket 15 and contains gasket 15 with a strong 360° metal enclosure.

The embodiment of FIG. 5 has the advantage of additional simplicity and reduced cost. However, the holding force of pipe coupling 40 is not as great as that encountered with pipe coupling 10 and renders pipe coupling 40 useful in low pressure applications. In addition, pipe coupling 40 does not permit pipe ends 41 and 42 freedom to expand and contract with temperature changes.

Figure 6:
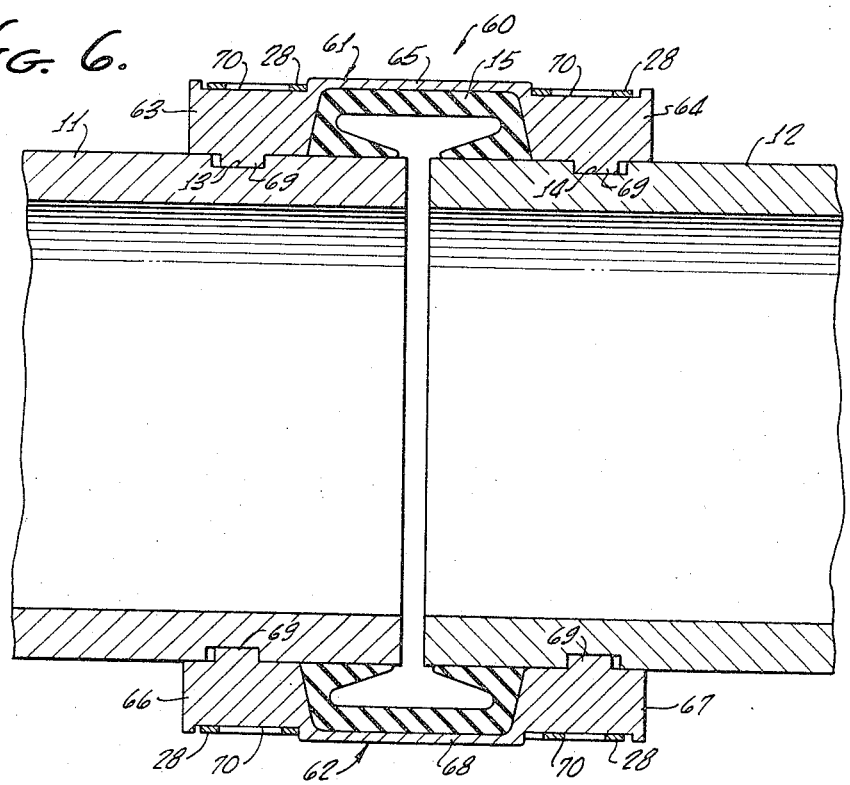
FIG. 6 is a cross-sectional view, similar to the view of FIG. 3, of a third embodiment of mechanical pipe coupling shown in operative position providing a fluid-tight joint between two abutting pipe ends in a high pressure system.

Referring now to FIG. 6, there is shown a third embodiment of mechanical pipe coupling, generally designated 60, for providing a fluid-tight joint between abutting pipe ends 11 and 12. Pipe coupling 60 is essentially identical to pipe coupling 10 and includes sealing gasket 15 and hose clamps 28. The only difference between pipe coupling 10 and pipe coupling 60 is that in pipe coupling 60, the connecting shield is made integral with the locking rings.

More particularly, pipe coupling 60 comprises first and second identical housing segments 61 and 62, housing segment 61 including a pair of semicircular locking rings 63 and 64 connected by a semicircular cylindrical section 65, and housing segment 62 including a pair of semicircular locking rings 66 and 67 connected by a semicircular cylindrical section 68. Each of locking rings 63, 64, 66, and 67 has the same general cross-sectional shape as locking rings 19 of pipe coupling 10. Thus, each of locking rings 63, 64, 66, and 67 has an inwardly projecting tongue 69 which is adapted to extend into grooves 13 and 14 in pipe ends 11 and 12, respectively. Each locking ring also has an annular groove 70 in the outer surface thereof for receipt of one of hose clamps 28. The sides of sections 65 and 68 are made integral with locking rings 63 and 64 and locking rings 66 and 67, respectively, thereby eliminating the separate connecting shield 25.

In use, pipe coupling 60 may be provided as an integral unit with sealing gasket 15 positioned between housing segments 61 and 62 and with hose clamps 28 in position around the opposite sides of housing segments 61 and 62, in grooves 70. With hose clamps 28 sufficiently loosened to permit an adequate space between housing segments 61 and 62, pipe ends 11 and 12 are positioned within pipe coupling 60, to the position shown in FIG. 6. Hose clamps 28 are then tightened to bring housing segments 61 and 62 together. In the tightened position, as shown in FIG. 6, housing segments 61 and 62 securely hold sealing gasket 15 in place and contain gasket 15 with a strong 360° metal enclosure. Tongues 69 of housing segments 61 and 62 engage the entire 360° of grooves 13 and 14 in pipe ends 11 and 12, respectively, in a grip that is both secure and flexible. Pipe coupling 60 permits pipe ends 11 and 12 freedom to expand and contract with temperature changes.

Of particular significance with the embodiment of FIG. 6 is the fact that hose clamps 28 apply a uniformly distributed compressive force around the entire circumference of housing segments 61 and 62, thereby minimizing the destructive forces thereon. Therefore, housing segments 61 and 62 may be made from inexpensive materials without fear of breakage. Also, because of the simple construction of housing segments 61 and 62, they may be machined or manufactured in any other simple manner.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:

1. A pipe coupling for providing a fluid-tight joint between two abutting pipe ends, each of said pipe ends having an annular groove in the outer surface thereof, comprising:

two pairs of identical, semicircular, locking rings, each locking ring having an inwardly projecting tongue adapted to extend into said grooves in said pipe ends and an annular groove in the outer surface thereof, one pair of said rings being adapted to surround one of said pipe ends and the other pair of said rings being adapted to surround the other of said pipe ends;

a resilient, annular, sealing gasket positioned between said pairs of locking rings and being positionable around said abutting pipe ends;

an elongate, planar, flexible, connecting shield positioned around said locking rings and said sealing gasket, the width of said connecting shield being approximately equal to the combined width of said sealing gasket and said pairs of locking rings, the opposite ends of said connecting shield overlapping; and a pair of hose clamps positioned around the sides of said connecting shield, said clamps being tightenable to secure said sides of said connecting shield in said grooves in said pairs of locking rings to connect said locking rings and said pipe ends together.

2. A pipe coupling according to claim 1 wherein said sides of said connecting shield have grooves therein which permit said sides to mate with said grooves in said locking rings.

3. A pipe coupling according to claim 1 wherein said sealing gasket has a generally trapezoidal cross-section and wherein at least one side of each of said locking rings is tapered at an angle equal to the angle of the sides of said sealing gasket, said one side of each of said locking rings being positioned in contact with said sealing gasket.

4. A pipe coupling according to claim 3 wherein the side of said tongue of each locking ring closest to said one side thereof is tapered at an acute angle relative to a plane normal to the axes of said pipe ends so that the inner periphery of said tongue is wider than the outer periphery thereof, and wherein the adjacent side of said grooves in said pipe ends are positioned at an identical angle.

5. A pipe coupling according to claim 1 wherein said tongues and said grooves in said pipe ends are rectangular.

6. A pipe coupling according to claim 1 wherein the side of said tongue of each locking ring positionable closest to said joint between said pipe ends is tapered at an acute angle relative to a plane normal to the axes of said pipe ends so that the inner periphery of said tongue is wider than the outer periphery thereof, and wherein the adjacent side of said grooves in said pipe ends are positioned at an identical angle.

7. A pipe coupling according to claim 6 wherein the overall width of each of said tongues is smaller than the overall width of each of said annular grooves in said pipe ends to permit insertion of said tongues into said grooves, said locking rings being movable towards each other after insertion of said tongues into said grooves to bring said tapered surfaces of said tongues and said grooves into contact, the spacing between said pairs of locking rings, when said tapered surfaces of said tongues are in contact with said tapered surfaces of said grooves, being equal to the width of said sealing gasket.

8. A pipe coupling according to claim 1 wherein each of said hose clamps is a worm drive hose clamp tightenable around said connecting shield.

9. A pipe coupling according to claim 1 wherein the width of each of said hose clamps is slightly less than the width of said grooves in said locking rings.

10. A pipe coupling for providing a fluid-tight joint between two abutting pipe ends, each of said pipe ends having an annular groove in the outer surface thereof, comprising:

a resilient, annular, sealing gasket being positionable around said abutting pipe ends;

an elongate, planar, flexible, connecting shield positioned around said sealing gasket, the central portion of said connecting shield conforming to the outer periphery of said sealing gasket, the opposite sides of said connecting shield being adapted to extend into said grooves in said pipe ends, the opposite ends of said connecting shield overlapping; and a pair of hose clamps positioned around said sides of said connecting shield, within said grooves in said pipe ends, said clamps being tightenable to secure said sides of said connecting shield in said grooves in said pipe ends to connect said shield to said pipe ends and said pipe ends together.

11. A pipe coupling for providing a fluid-tight joint between two abutting pipe ends, each of said pipe ends having an annular groove in the outer surface thereof, comprising:

first and second identical, semicircular, housing segments, each of said housing segments including a pair of identical, semicircular, locking rings connected by a semicircular, cylindrical section, each locking ring having an inwardly projecting tongue adapted to extend into the respective grooves in said pipe ends and an annular groove in the outer surface thereof, one of said rings being adapted to surround half of one of said pipe ends and the other of said rings being adapted to surround half of the other of said pipe ends;

a resilient, annular, sealing gasket positioned between said housing segments, between said locking rings of each housing segment, the inner periphery of said housing segments conforming to the outer periphery of said sealing gasket, said sealing gasket being positionable around said abutting pipe ends; and a pair of hose clamps positioned around said housing segments, in said grooves in said locking rings, said clamps being tightenable to bring said housing segments together and to secure said housing segments to said pipe ends with said tongues in said grooves therein.

12. A pipe coupling according to claim 11 wherein said tongue of each of said locking rings and said grooves in said pipe ends are rectangular.

13. A pipe coupling according to claim 11 wherein the side of said tongue of each locking ring positionable closest to said joint between said pipe ends is tapered at an acute angle relative to a plane normal to the axes of said pipe ends so that the inner periphery of said tongue is wider than the outer periphery thereof, and wherein the adjacent side of said grooves in said pipe ends are positioned at an identical angle.

14. A pipe coupling according to claim 13 wherein the overall width of each of said tongues is smaller than the overall width of each of said annular grooves in said pipe ends to permit insertion of said tongues into said grooves, said pipe ends being moveable away from each other after insertion of said tongues into said grooves to bring said tapered surfaces of said tongues and said grooves into contact.

* * * * *